United States Patent [19]
Luks

[11] Patent Number: 4,464,958
[45] Date of Patent: Aug. 14, 1984

[54] BAR STOCK PULLER

[76] Inventor: Charles J. Luks, 3001 Wiltshire Rd., North Royalton, Ohio 44133

[21] Appl. No.: 364,991

[22] Filed: Apr. 2, 1982

[51] Int. Cl.³ .............................................. B23B 13/02
[52] U.S. Cl. ..................................... 82/2.5; 33/181 R; 29/57; 279/110; 414/14
[58] Field of Search ...................... 279/106, 110, 119; 33/181; 82/2.5, 2.7; 29/57; 414/14, 17

[56] References Cited
U.S. PATENT DOCUMENTS

| 364,126 | 5/1887 | McCool | 82/2.5 |
| 477,513 | 6/1892 | Conradson | 414/14 |
| 932,394 | 8/1909 | Johnson | 414/14 |
| 2,710,194 | 6/1955 | Bailey | 279/106 |
| 2,722,427 | 11/1955 | Labeyrie | 279/119 |
| 2,726,092 | 12/1955 | Daniels | 279/110 |
| 3,104,474 | 9/1963 | Rehart | 33/181 |
| 3,582,000 | 1/1971 | Werkmeister | 82/2.7 |
| 3,664,215 | 5/1972 | Selby | 82/2.5 |

FOREIGN PATENT DOCUMENTS 608613  5/1978  U.S.S.R. .................. 82/2.5

Primary Examiner—W. D. Bray
Attorney, Agent, or Firm—Watts, Hoffmann, Fisher & Heinke Co.

[57] ABSTRACT

A bar stock puller for advancing bar stock in a machine tool including a tool body having a shank engageable by a tool holder and a jaw support portion pivotally mounting a pair of jaw assemblies that define spaced, opposed jaws adjustably mounted to a pair of jaw holders. The replaceable jaws define V-shaped, confronting gripping surfaces for engaging the circumference of substantially round bar stock and are biased towards each other in a clamping direction by a spring biasing force applied to the jaw holders by a plunger and an adjustable spring located within the shank. The jaw holders also define recesses which together define a gauge receiving opening by which the bar puller can be preset for a particular bar stock size at a location remote from the machine tool.

10 Claims, 5 Drawing Figures

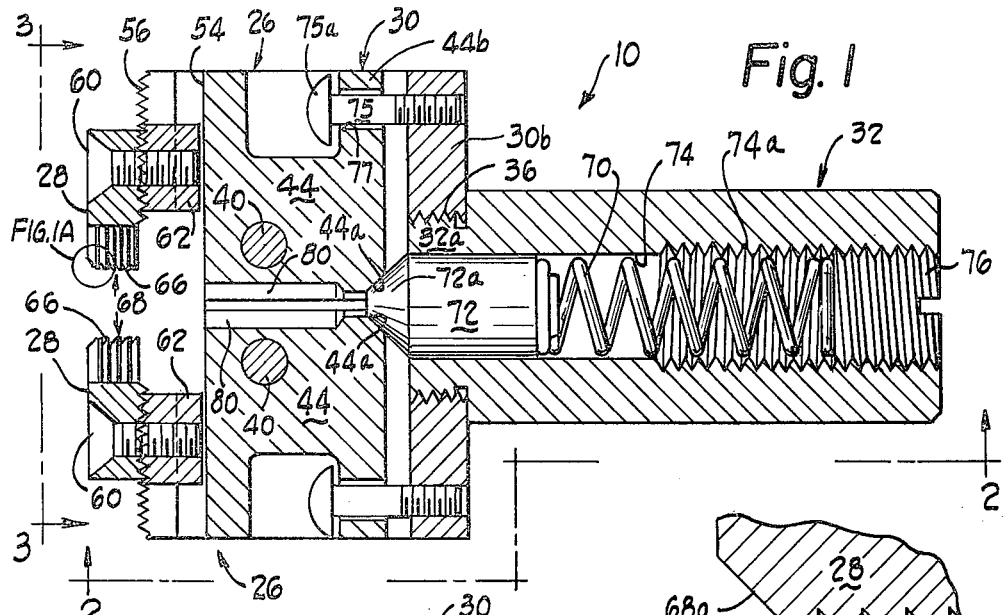
Fig. 1
Fig. 1A
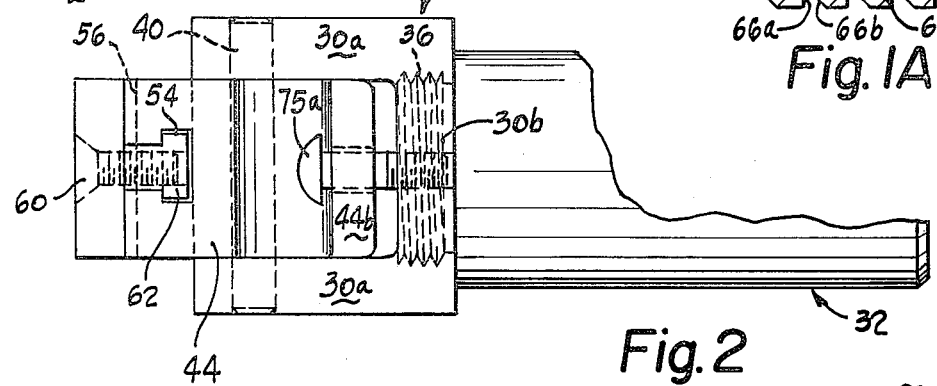
Fig. 2
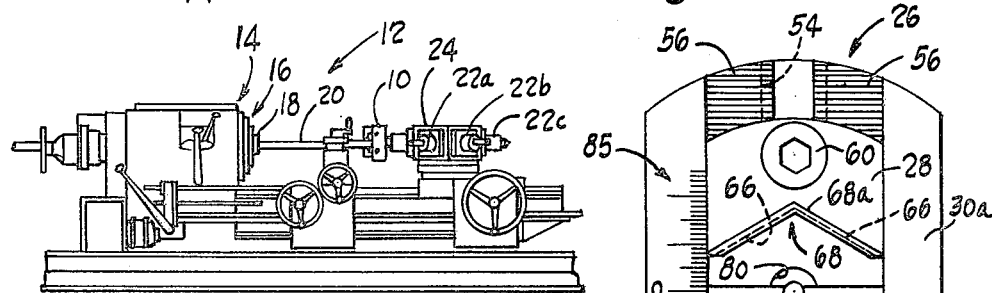
Fig. 4
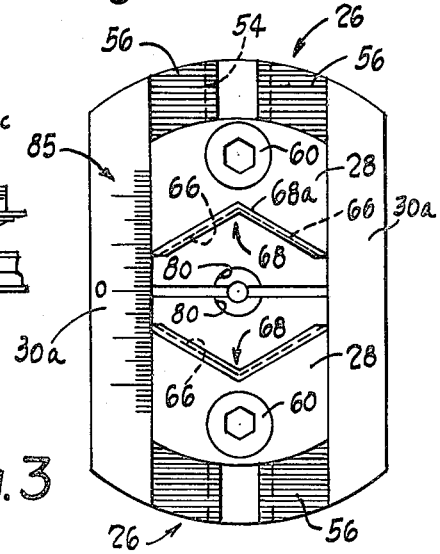
Fig. 3

BAR STOCK PULLER

DESCRIPTION

1. Technical Field

The present invention relates generally to machine tools and in particular to an apparatus for advancing bar stock in a machine tool such as numerical control machine, turret lathe, screw machine, or the like.

2. Background Art

In a typical "turning" operation, a machine tool such as a turret lathe, is employed to provide the necessary machining steps. In general, bar stock is clamped and rotated by a spindle assembly and a tool holder typically mounting a plurality of machining tools, is moved to predetermined positions with respect to the bar stock. A series of machining steps is sequentially performed by moving the machining tools towards and away from the rotating bar stock. At the conclusion of the machining cycle, the finished workpiece is usually severed from the bar stock.

The bar stock must then be advanced to bring a new section of the bar stock into the machining station. In some machines, this advancing step is accomplished manually by the operator who, after releasing the bar stock from the spindle assembly, pushes the bar stock forward through the spindle assembly.

Apparatus for automatically advancing the bar stock prior to initiation of the machining cycle has been suggested. In some machines, a stock feed mechanism is positioned behind the spindle assembly and is actuated to grip the stock at the conclusion of a machining cycle and push it forward through the spindle assembly. With this type of arrangement, considerable set up time is necessary to change the feed assembly to accept a different size bar stock and the feed assembly itself takes up additional floor space in the plant.

Arrangements for pulling the bar stock by engaging the end projecting through the spindle assembly have also been suggested. It has been found that in some prior art devices, the bar would occasionally be released prematurely by the gripping member resulting in a mispositioned workpiece. Other more reliable devices have been proposed; however, some of these have been found to require an excessive amount of work space at the machining station and therefore are not acceptable.

Additionally, in order to minimize machine downtime, it is desirable to provide machining tools and attachments that can be preset at a location remote from the machine such as a tool crib. In this way, changing over to a different machining operation necessitates only minimal set up time requiring only the mounting of the various machining tools. Many prior art bar stock feeders would appear to require precise set up and aligning procedures that could be performed only when the device was mounted on the machine, resulting in excessive down time for the machine whenever a work change over was needed.

DISCLOSURE OF THE INVENTION

The present invention provides a new and improved bar stock pulling device that is simple and reliable and can be pre-adjusted for a particular bar stock size prior to machine mounting.

In the preferred embodiment, the present invention comprises a tool body including a portion engageable by a tool holder forming part of the machine tool and a jaw support portion that pivotally mounts a pair of jaw assemblies that include spaced, opposed jaws, each jaw defining a confronting, serrated gripping surface. The jaws are angularly movable towards and away from each other about pivotal axes defined by the jaw support portion of the tool body and are yieldably urged towards each other in a clamping direction by a biasing means, preferably a spring. In the exemplary embodiment, the puller is mounted in the tool holder of the machine tool and is indexed into position prior to the commencement of a machining cycle. In operation, the tool holder is advanced towards the head stock of the machine tool so that the jaws of the puller are driven against the end of the bar stock projecting from the spindle assembly. According to a feature of the invention, the jaws include camming surfaces which upon contact with the end of the bar stock cause separation of the jaws to enable the gripping surfaces to engage the circumference of the bar stock. In the preferred embodiment, the line of action of the puller in engaging the end of the bar stock is parallel to the bar stock axis.

Unlike the prior art, the present invention provides a simple yet effective apparatus for advancing bar stock from the spindle assembly. The compact nature of the disclosed bar puller allows it to be used in virtually any application for it requires a minimum of work space and in most instances requires no more space than the other tools mounted in the tool holder.

In the preferred and illustrated embodiment, the jaws are fastened to respective jaw holders forming a part of each jaw assembly which in turn are pivotally mounted to the jaw support portion of the tool body. The mounting position of the jaw to its respective jaw holder is adjustable preferably in 1/16 inch increments, so that the relative spacing between the jaws can be changed in order to accommodate a wide variety of bar stock diameters. In addition, the serrated gripping surface defined by each jaw is substantially V-shaped in cross section and preferably defines an included angle of 60°. According to another feature of the invention, the tool body also mounts jaw stops for limiting the angular movement of the jaws to predetermined limits. In one construction, the stops comprise spaced, laterally extending pins which extend through apertures disposed in leg portions formed integrally with each jaw holder.

According to still other features of the invention, the body portion engageable by the machine tool holder, preferably comprises a shank threadedly engaged with the jaw support portion, enabling various sized shanks to be attached to the jaw support portion to accommodate various machine tools and/or tool holders. In the preferred embodiment, an axial passage is formed in the shank and a spring biased plunger is captured therein. The plunger includes a wedge-shaped surface that coengages corner surfaces on the jaw holders tending to urge them apart, thereby biasing the serrated surfaces of the jaws towards each other in a clamping direction. According to this feature, the spring is captured within the shank by a plug threadedly received by the shank, which provides a force adjustment for the spring.

According to another feature of the invention, the bar stock puller includes an arrangement which enables the tool to be preset for a predetermined bar stock diameter prior to mounting on the machine tool. In the preferred embodiment, each jaw holder includes recesses that together define a gauge receiving opening such that insertion of a set-up gauge fixes the jaws in a predetermined alignment to facilitate adjustment of the jaw spacing. In the preferred embodiment, each recess is semi-circular so that the jaws together define an opening substantially circular in cross-section. Alternately, a scale located on the jaw support portion of the tool body, adjacent the jaws, is used to preset the jaw positions.

The present invention provides a simple and reliable device for advancing bar stock in a machine tool. Unlike many prior art devices, the present invention requires only a minimal amount of work space and more importantly can be preset for various bar stock diameters prior to mounting in the tool holder.

Additional features and a fuller understanding of the present invention will be obtained in reading the following detailed description made in connection with the accompanying drawings.

BRIEF DESCRIPTION OF THE DRAWINGS

FIG. 1 is a sectional view of a bar stock puller constructed in accordance with the preferred embodiment of the invention;

FIG. 1A is an enlarged, fragmentary view of a portion of the bar stock puller as indicated in FIG. 1;

FIG. 2 is a side elevational view of the bar puller as seen from the plane indicated by the line 2—2 in FIG. 1;

FIG. 3 is an end view of the bar puller as seen from the plane indicated by the line 3—3 in FIG. 1; and, FIG. 4 illustrates the bar puller in an operating position on a machine tool.

BEST MODE FOR CARRYING OUT THE INVENTION

FIGS. 1-3 illustrate the overall construction of a bar puller 10 constructed in accordance with a preferred embodiment of the invention. The puller 10 is operable in connection with a fully automatic machine tool, such as a numerical control turning center (not shown) as well as a semi-automatic or manually operated machine such as a turret lathe 12 illustrated in FIG. 4. As is conventional, the machine tool 12 includes a head stock 14 that rotatably mounts a spindle assembly 16. The spindle 16 usually includes a chuck assembly 18 that is operative to grasp bar stock 20 so that rotation of the spindle 16 rotates the bar stock.

The machine tool normally includes a tool holder that mounts a plurality of tools 22a-22c. In the exampled turret lathe 12, the tool holder comprises a turret assembly 24 rotatable about a vertical axis to position one of the tools 22a-22c in a matching position.

In the preferred embodiment, the bar stock puller 10 is mounted in one of the tool positions on the turret assembly 24 and is indexed into its operating position at the initiation of a machining cycle. As is conventional, at the end of a machining cycle, the completed workpiece is severed from the length of bar stock 20. The chuck 18 is then released to enable the bar stock to move laterally to position a raw section of the material at the work station. With the present invention, the bar stock puller 10 is first positioned in alignment with the end of the bar stock 20. The turret assembly 24 is then driven towards the head stock 14 until the puller 10 engages the end of the bar stock. The bar stock is released by the chuck 18 and subsequently, movement in the turret assembly 24 is reversed in order to pull the bar stock from the spindle assembly 16. The bar is then reclamped by the chuck.

Returning now to FIGS. 1-3, the bar stock puller 10 includes a pair of pivotally mounted jaw assemblies 26 defining a pair of opposed jaws 28. The jaw assemblies are supported by a tool body having a jaw support portion 30 and a shank 32, threadedly received by the jaw support portion 30. The shank 32 is engageable by the tool holder of a machine tool, such as the turret assembly 24 (shown in FIG. 4). In the preferred embodiment, the shank threadedly engages the jaw support portion 30 to allow differently sized and shaped shanks to be attached in order to accommodate various types of tool holders.

The jaw support portion 30 is substantially U-shaped in cross section and includes a pair of laterally extending, parallel ears 30a (shown best in FIG. 2) extending from and preferably integrally formed with a back plate 30b. In the preferred embodiment, the back plate 30b includes a threaded aperture 36 centrally positioned and adapted to receive a threaded portion 36 of the shank 32.

As viewed in FIG. 1, a pair of aligned, vertically spaced pins 40 extend between the ears 30a (see also FIG. 2) and are preferably press fitted into aligned apertures formed in each ear 30a. The pins 40 pivotally mount jaw holders 44 to the jaw support portion 30. The jaws 28 are in turn, mounted to a respective one of the jaw holders 44 so that pivotal motion in the holders 44 moves the jaws towards and away from each other.

As seen best in FIG. 2, each jaw holder 44 includes a slot 54, T-shaped in cross-section, and a series of equally spaced teeth 56 formed on the left end face of each jaw holder 44 (shown best in FIG. 1). Preferably, the teeth 56 comprise 0.031 pitch, 60° serrations. Each jaw 28 includes complimentary shaped teeth 58 that mate with the teeth 56. The jaws 28 are clamped to the jaw holders 44 by a threaded fastener, preferably a flat head screw 60 that threadedly engages a T-nut 62 located in and slidable along each T-slot 54.

The spacing between the jaws 28 is adjustable to accommodate various sized bar stock. To adjust the position of a jaw 28, the fastener 60 is loosened until the jaw 28 is released by the teeth 56 on the jaw holder. The jaw 28 is then moved to the desired position and the fastener 60 retightened so that the teeth 58 on the jaw 28 engages the teeth 56 on the jaw holder 44 thereby locking the position of the jaw with respect to the holder.

Bar stock gripping teeth 66 are defined on confronting faces 68 of each jaw 28. In the preferred embodiment, the teeth 66 are saw-tooth shaped and each tooth is defined (as viewed in FIG. 1A by a vertical surface 66a and a canted surface 66b that meets the vertical surface 66a at an angle of substantially 45°. For a bar puller adapted to advance bar stock having a diameter of two inches or less, gripping teeth 66, spaced 0.015 inches apart and 0.015 inches deep (the depth being defined by the vertical surface 66a) has been found satisfactory.

As seen best in FIG. 3, the confronting faces 68 of each jaw 28 are V-shaped and preferably define an included angle of substantially 60°. In the preferred embodiment, the leading edge 68a of each jaw defines a camming surface which serves to expand the jaws 28 upon engaging the end of the bar stock to enable the confronting faces 68 to slide over the circumference of the bar stock.

The V-shaped configuration of the illustrated jaws 28 has been found to be especially effective for substantially round bar stock. It has been found that a single set of jaws can be used for a plurality of round bar stock diameters. For bar stock having other than a circular cross section, alternately shaped jaws can be mounted to the jaw holders. For example, to use the bar puller of the present invention with hex-shaped or square bar stock, it has been found that jaws having semicircular confronting surfaces to be satisfactory.

The jaws 28 are biased in a clamping direction by a spring 70 and plunger 72 slidably mounted within the shank 32. A central bore 74 including a threaded portion 74a extends axially through the shank 32. The plunger 72 includes a wedge-shaped surface 72a that coengages canted, camming surfaces 44a at the inner corners of each jaw holder 44. The spring 70 which is captured within the bore 74 by a threaded plug 76 resiliently biases the plunger 72 against the jaw holders 44, urging them apart and rotating them about the pivots 40 thereby urging the jaws 28 towards each other. When the bar puller 10 engages the bar stock, the spring 70 determines the clamping force that is exerted on the bar stock by the gripping jaws 28. The threaded plug 76 is used to adjust the compression of the spring 70 and hence the bar stock gripping force.

Movement in the jaws 28, towards each other, is limited by jaw stops 75 which cooperate with leg portions 44b formed in each jaw holder. Each jaw stop 75 comprises a threaded fastener that extends through an aperture 77 formed in each leg portion 44b and threadedly engages the back plate 30b. A head 75a of the stop 75 limits the leftward (as viewed in FIG. 1) movement of the jaw holders 44, thereby determining the minimum gap between the jaws 28. In an alternate embodiment, movement in the jaws 28 can be controlled by appropriate selection of the clearance between the jaw holders 44 and the back plate 30b of the jaw support portion 30 and/or the selection of clearance between the confronting portions of the jaw holders 44.

According to one of the features of the invention, a gauge receiving opening is defined between the jaw holders 44. In the preferred embodiment, each holder 44 defines a semi-cylindrical recess 80. Together, the jaw holders 44 define a cylindrical opening adapted to receive a set-up gauge (not shown) often termed a set master. The gauge typically includes a pin, sized to slidably fit between the recesses 80 of the jaw holders 44. When the gauge is inserted, the jaw holders are maintained in the position shown in FIG. 1 in which the jaws 28 are in parallel alignment. The set master would include a portion equal in size and/or shape of the bar stock being used, located so that the portion is positioned between the jaws 28 when the set master is inserted in the bar puller. Once it is inserted, the jaws are adjusted until the V-shaped, confronting surfaces 68 coengage the circumferential surface of the bar stock matching portion of the gauge. With the present arrangement, the bar puller 10 can be preset at a location remote from the machine thus minimizing machine downtime. When a machine tool changeover is effected, a previously adjusted bar puller is merely inserted into one of the tool holder positions on the tool holder 24 (see FIG. 4) and is immediately operable to grip and advance bar stock from the spindle assembly 16.

In addition, or in the alternative, to the provision for remote adjustment described above, the tool body includes a scale 85 defining jaw positioning indicia, such as scribe lines. As seen in FIG. 3 the scale 85 is located on one of the ears 30a of the jaw support portion 30 of the tool body, adjacent the jaws 28. The scale facilitates the positioning of the jaws.

The bar puller would operate as follows: prior to commencing the machining cycle, the tool holder 24 is rotated to position the bar puller 10 in alignment with the end of the bar stock. The holder 24 is then advanced towards the head stock 14 until the jaw camming surfaces contact the end of the bar stock, causing the jaws 28 to spread and slide over the bar stock end. After the chuck 18 is released, the motion in the tool holder 24 is then reversed so that the bar stock is drawn from the spindle assembly. In the preferred configuration, the jaws yieldably grip the end of the bar stock so that upon re-engagement of the chuck assembly 18 to grip and hold the bar stock, further movement in the tool holder 24 away from the head stock causes the bar puller to be pulled from the bar stock end. In this preferred construction the need for a separate jaw-releasing mechanism is eliminated.

In the illustrated embodiment, the shank 32 is rigidly attached to the jaw supporting portion 30 of the tool body. In the operating method described above, the shank is rigidly mounted in a machine tool holder. With this arrangement, rotation of the chuck assembly must be terminated in order for the bar puller to engage the end of the bar stock. The present invention, however, also contemplates other puller constructions and mountings which would allow the puller to rotate and thus engage the end of rotating bar stock. For example, those skilled in the art will recognize that the fixed connection between the shank 32 and the jaw support portion 30 can be replaced by a rotatable connection which would allow the jaw support portion 30 to rotate relative to the shank. With this type of construction, bar stock could be advanced even while the chuck assembly 16 was rotating.

Although the invention has been described with a certain degree of particularity, it should be understood that those skilled in the art can make various changes to the invention without departing from the spirit or scope of the invention as hereinafter claimed.

I claim:

1. A bar stock puller for a numerical control turning center, turret lathe, screw machine, or the like, comprising:
   (a) a tool body including a jaw support portion and a portion engageable by a tool holding means;
   (b) spaced, opposed jaws including confronting, bar stock gripping surfaces;
   (c) jaw mounting means mounting each jaw for pivotal movement towards and away from each other, about pivotal axes defined by said jaw support portion of said tool body;
   (d) jaw biasing means yieldably urging said jaws towards each other;
   (e) means for aligning said jaws with bar stock to be pulled including means for imparting reciprocating motion to said tool body along a line of action substantially coincident with the axis of the said bar stock.

2. The apparatus of claim 1 wherein said jaws include camming surfaces contactable with the end of the bar stock to be pulled to effect separation of said jaws to enable said jaws to engage the circumferential surface of said bar.

3. The apparatus of claim 2 further comprising stops for limiting the pivotal movement in said jaws to predetermined limits.

4. The apparatus of claim 1 wherein said confronting surfaces are V-shaped and define an angle of substantially 60°.

5. The apparatus of claim 1 wherein each jaw mounting means includes recesses that define a gauge receiving opening for fixing said jaws in a predetermined alignment to facilitate adjustment of the jaw spacing to accommodate a particular diameter of bar to be pulled.

6. The apparatus of claim 5 wherein said gauge receiving opening is substantially circular in cross section.

7. The apparatus of claim 1 wherein said body portion engageable by a tool holding means comprises a replaceable shank threadedly received by said jaw support portion.

8. The apparatus of claim 1 wherein said jaw biasing means comprises a spring biased plunger slidably mounted within said body portion engageable by said tool holding means, said plunger including a force applying portion coengaging portions of said jaws for applying forces to said jaw mounting means tending to rotate said mounting means about said pivotal axes in a jaw closing direction.

9. The apparatus of claim 1 wherein said tool holding means, includes said means for aligning said jaws with bar stock to be pulled.

10. A bar stock puller for a numerical control turning center, turret lathe, screw machine or the like, comprising:
 (a) a tool body including a jaw support portion and a portion engageable by a tool holding means;
 (b) spaced, opposed jaws including confronting, bar stock gripping surfaces;
 (c) jaw support means mounting each jaw to said jaw support portion of said tool body, said jaws mounted for pivotal movement towards and away from each other, about pivotal axes defined by said jaw support portion;
 (d) jaw biasing means yieldably urging said jaws toward each other;
 (e) said tool holding means including means for aligning said jaws with bar stock to be pulled and including means for imparting reciprocating motion to said tool body along a line of action substantially coincident with the axis of said bar stock; and,
 (f) said jaws including camming surfaces contactable with the end of the bar stock to be pulled to effect separation of said jaws to enable said jaws to engage a circumferential surface of said bar stock.

* * * * *